(12) United States Patent
Geng et al.

(10) Patent No.: US 11,881,972 B2
(45) Date of Patent: Jan. 23, 2024

(54) SMOOTH TRANSITION FOR DATA STREAMS WITH ADJUSTED GAIN

(71) Applicant: ZEKU TECHNOLOGY (SHANGHAI) CORP., LTD., Shanghai (CN)

(72) Inventors: Jifeng Geng, San Diego, CA (US); Hong Kui Yang, San Diego, CA (US)

(73) Assignee: ZEKU TECHNOLOGY (SHANGHAI) CORP., LTD., Shanghai (CN)

( * ) Notice: Subject to any disclaimer, the term of this patent is extended or adjusted under 35 U.S.C. 154(b) by 0 days.

(21) Appl. No.: 17/818,994

(22) Filed: Aug. 11, 2022

(65) Prior Publication Data

US 2023/0057504 A1  Feb. 23, 2023

Related U.S. Application Data

(63) Continuation of application No. PCT/IB2020/060833, filed on Nov. 18, 2020.

(60) Provisional application No. 62/978,019, filed on Feb. 18, 2020.

(51) Int. Cl.
| | | |
|---|---|---|
| *H04L 27/26* | (2006.01) | |
| *H04L 25/03* | (2006.01) | |
| *H04B 1/04* | (2006.01) | |

(52) U.S. Cl.
CPC ..... *H04L 25/03834* (2013.01); *H04B 1/0475* (2013.01); *H04L 27/2626* (2013.01); *H04B 2001/0425* (2013.01)

(58) Field of Classification Search
CPC .......... H04L 25/03834; H04L 27/2626; H04B 1/0475; H04B 2001/0425

USPC .................................................. 375/260, 297
See application file for complete search history.

(56) References Cited

U.S. PATENT DOCUMENTS

| | | | |
|---|---|---|---|
| 6,490,261 B1 * | 12/2002 | Dent ........................ | H04B 7/06 370/347 |
| 10,491,261 B1 | 11/2019 | Al-Eidan | |
| 2007/0201346 A1 | 8/2007 | Geile et al. | |
| 2009/0245409 A1 | 10/2009 | Kandukuri Narayan et al. | |
| 2009/0268603 A1 | 10/2009 | Sampath et al. | |
| 2009/0310690 A1 * | 12/2009 | Lee ....................... | H03G 3/3078 375/345 |

(Continued)

OTHER PUBLICATIONS

WIPO, International Search Report and Written Opinion for PCT/IB2020/060833, dated May 13, 2021.

*Primary Examiner* — Emmanuel Bayard
(74) *Attorney, Agent, or Firm* — Hodgson Russ LLP

(57) ABSTRACT

Embodiments of apparatus and method for transition smoothing implementation on a stream of data are disclosed. In an example, a system on chip (SoC) for wireless communication includes a digital front-end. The digital front-end is configured to obtain a stream of data having one carrier or multi-carriers. The stream of data is divided into a plurality of blocks. The digital front-end is also configured to adjust a gain of the stream of data based on a predetermined frequency corresponding to a length of each of the plurality of blocks. The digital front-end is also configured to append a ramp-down tail sequence to a first block of the stream of data after a last sample of the first block, and generate a ramp-up head sequence for a second block immediately after the first block, based on a head sequence of the second block.

20 Claims, 9 Drawing Sheets

(56) References Cited

U.S. PATENT DOCUMENTS

2014/0307810 A1* 10/2014 Batra ................ H04L 27/26265
  375/295
2019/0199383 A1* 6/2019 Pekoz ............... H04L 25/03834
2019/0199384 A1* 6/2019 Pekoz .................. H04B 17/336
2019/0281588 A1    9/2019 Zhang et al.

* cited by examiner

SMOOTH TRANSITION FOR DATA STREAMS WITH ADJUSTED GAIN

CROSS-REFERENCE TO RELATED APPLICATION

This application is a continuation of International Patent Application No. PCT/IB2020/060833, filed Nov. 19, 2020, which claims priority to U.S. Provisional Patent Application No. 62/978,019, filed Feb. 18, 2020, the entire disclosures of which are incorporated herein by reference.

BACKGROUND

Embodiments of the present disclosure relate to apparatus and method for wireless communication.

Wireless communication systems are widely deployed to provide various telecommunication services such as telephony, video, data, messaging, and broadcasts. Orthogonal frequency division multiplexing (OFDM) is one of the most widely used and adopted digital multi-carrier modulation methods and has been used extensively for cellular communications, such as 4th-generation (4G) Long Term Evolution (LTE) and 5th-generation (5G) New Radio (NR). One version of OFDM, for example, used in 4G LTE, is cyclic prefix OFDM (CF-OFDM), which has a waveform format that is designed to overcome the inter-symbol interference (ISI) resulting from delays and reflections.

SUMMARY

Embodiments of apparatus and method for transition smoothing implementation on a stream of data are disclosed herein.

In one example, a system on chip (SoC) for wireless communication includes a digital front-end. The digital front-end is configured to obtain a stream of data having at least one carrier. The stream of data is divided into a plurality of blocks. The digital front-end is also configured to adjust a gain of the stream of data based on a predetermined frequency corresponding to a length of each of the plurality of blocks. The digital front-end is also configured to append a ramp-down tail sequence to a first block of the stream of data after a last sample of the first block, and generate a ramp-up head sequence for a second block immediately after the first block, based on a head sequence of the second block.

In another example, a radio frequency (RF) chip includes a digital front-end including a multiplexer module, a nonlinearity compensation module, and a transition smoothing module. The multiplexer module is configured to combine a plurality of orthogonal frequency-division multiplexing (OFDM) symbol streams having different component carriers in a time domain or to transform a single OFDM symbol stream to generate a stream of data having at least one carrier. The nonlinearity compensation module is configured to adjust a gain of the stream of data based on a predetermined frequency corresponding to a length of each of a plurality of blocks, and apply a digital pre-distortion to the stream of data to compensate a nonlinearity of the stream of data. The stream of data is divided into the plurality of blocks. The transition smoothing module is configured to apply a soft edge pulse-shaping process to smooth transitions of the plurality of blocks.

In yet another example, a method for wireless communication is disclosed. A stream of data having at least one carrier is obtained. The stream of data is divided into a plurality of blocks. A gain of the stream of data is adjusted at a predetermined frequency corresponding to a length of each of the plurality of blocks. A ramp-down tail sequence is appended to a first block of the stream of data after a last sample of the first block. A ramp-up head sequence is generated for a second block immediately after the first block, based on a head sequence of the second block.

BRIEF DESCRIPTION OF THE DRAWINGS

The accompanying drawings, which are incorporated herein and form a part of the specification, illustrate embodiments of the present disclosure and, together with the description, further serve to explain the principles of the present disclosure and to enable a person skilled in the pertinent art to make and use the present disclosure.

Figure 1:
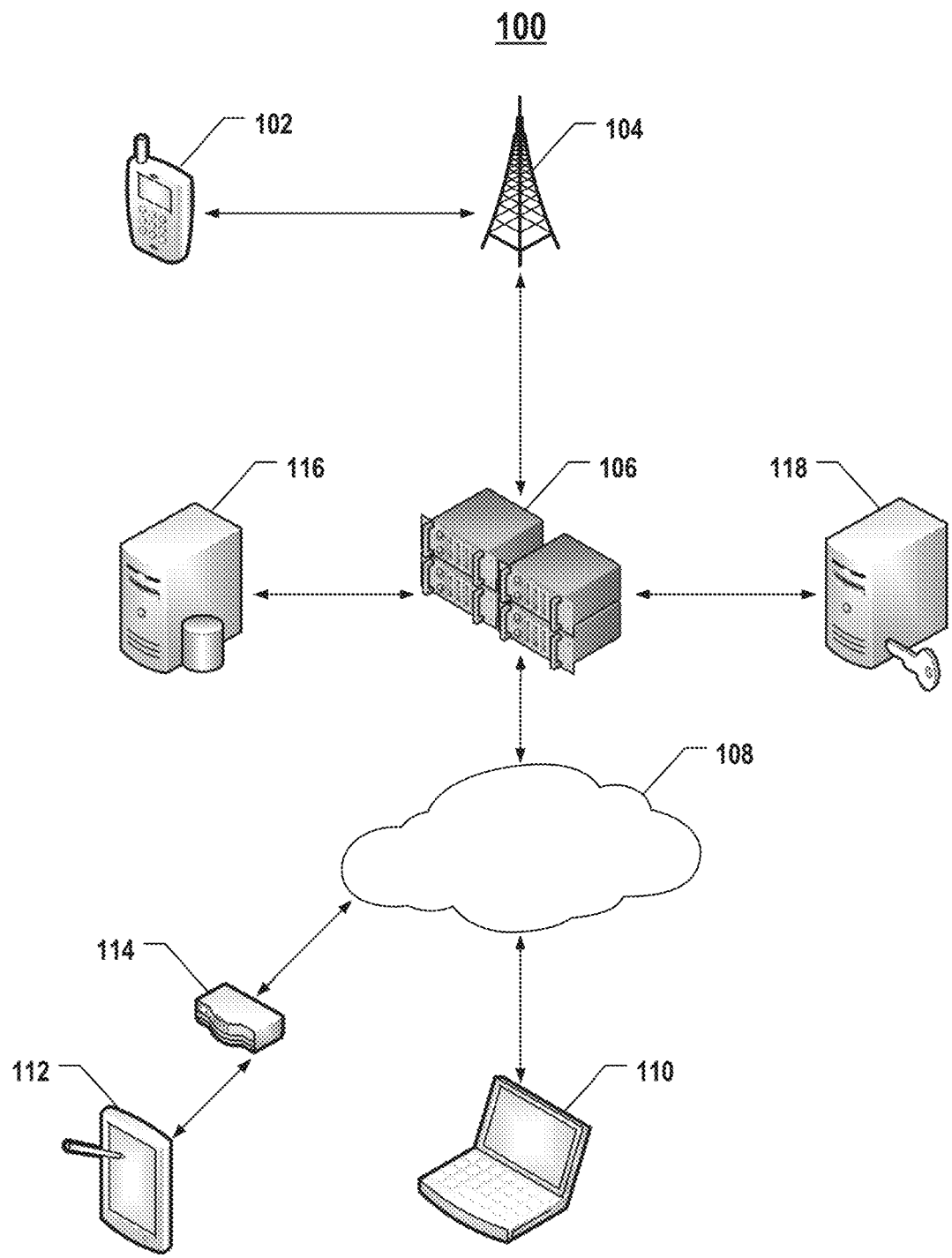
FIG. 1 illustrates an exemplary wireless network, according to some embodiments of the present disclosure.

Embodiments of the present disclosure will be described with reference to the accompanying drawings.

DETAILED DESCRIPTION

Although specific configurations and arrangements are discussed, it should be understood that this is done for illustrative purposes only. A person skilled in the pertinent art will recognize that other configurations and arrangements can be used without departing from the spirit and scope of the present disclosure. It will be apparent to a person skilled in the pertinent art that the present disclosure can also be employed in a variety of other applications.

It is noted that references in the specification to "one embodiment," "an embodiment," "an example embodiment," "some embodiments," "certain embodiments," etc., indicate that the embodiment described may include a particular feature, structure, or characteristic, but every embodiment may not necessarily include the particular feature, structure, or characteristic. Moreover, such phrases do not necessarily refer to the same embodiment. Further, when a particular feature, structure, or characteristic is described in connection with an embodiment, it would be within the knowledge of a person skilled in the pertinent art to effect such feature, structure, or characteristic in connection with other embodiments whether or not explicitly described.

In general, terminology may be understood at least in part from usage in context. For example, the term "one or more" as used herein, depending at least in part upon context, may be used to describe any feature, structure, or characteristic in a singular sense or may be used to describe combinations of features, structures or characteristics in a plural sense. Similarly, terms, such as "a," "an," or "the," again, may be understood to convey a singular usage or to convey a plural usage, depending at least in part upon context. In addition, the term "based on" may be understood as not necessarily intended to convey an exclusive set of factors and may, instead, allow for existence of additional factors not necessarily expressly described, again, depending at least in part on context.

Various aspects of wireless communication systems will now be described with reference to various apparatus and methods. These apparatus and methods will be described in the following detailed description and illustrated in the accompanying drawings by various blocks, modules, units, components, circuits, steps, operations, processes, algorithms, etc. (collectively referred to as "elements"). These elements may be implemented using electronic hardware, firmware, computer software, or any combination thereof. Whether such elements are implemented as hardware, firmware, or software depends upon the particular application and design constraints imposed on the overall system.

The techniques described herein may be used for various wireless communication networks, such as code division multiple access (CDMA) system, time division multiple access (TDMA) system, frequency division multiple access (FDMA) system, orthogonal frequency division multiple access (OFDMA) system, single-carrier frequency division multiple access (SC-FDMA) system, and other networks. The terms "network" and "system" are often used interchangeably. A CDMA network may implement a radio access technology (RAT), such as Universal Terrestrial Radio Access (UTRA), evolved UTRA (E-UTRA), CDMA 2000, etc. A TDMA network may implement a RAT, such as GSM. An OFDMA network may implement a RAT, such as LTE or NR. The techniques described herein may be used for the wireless networks and RATs mentioned above, as well as other wireless networks and RATs.

One of the drawbacks of conventional OFDM waveforms used in the 4G and 5G wireless networks, such as CP-OFDM, is the large out-of-band (OOB) emissions, despite its ability to inhibit ISI between successive OFDM symbols. These emissions are undesirable and may cause harmful interference to adjacent channels. WOLA is a technique in digital signal processing to effectively reduce the OOB emissions by smoothing the edges between two adjacent OFDM symbols.

Some solutions implementing WOLA-OFDM are based on CP-OFDM where a portion of the OFDM symbol is appended at the end overlapping with the beginning of the next OFDM symbol. In addition, time-domain windowing using a pulse with soft edges can be applied to the appended portion, compared with a rectangular pulse in conventional OFDM. This leads to superior spectral containment and allows a smooth transition from one symbol to the next, which leads to better OOB attenuation compared with CP-OFDM.

In the up-link, OFDM symbol streams having different component carriers (e.g., asynchronized component carriers having different operating frequencies) are usually combined by a multiplexer module (as known as data selector) for increasing the data density both in time and bandwidth and for the multiple OFDM symbol streams to share one device or resource, such as digital pre-distortion (DGD), digital gain, etc. After being combined, OFDM symbol streams having different component carriers are combined into a stream of data having multi-carriers where the symbol boundary information for each OFDM symbol (e.g., the information indicative of the starting point and the endpoint of each OFDM symbol, and/or the length of a cyclic prefix, the length of a cyclic suffix, etc.) may be lost because the different component carriers of the OFDM symbol streams are normally asynchronized. In some embodiments, even though the stream of data may initially have a smooth transition between each symbol (e.g., WOLA or other existing pulse-shaping approaches may be applied to each OFDM symbol stream before being combined by the multiplexer module), when digital pre-distortion and/or digital gain adjustment are applied, the smooth transition between the blocks (e.g., divided by applying the digital pre-distortion and/or digital gain) may be broken up. It becomes impractical to apply WOLA or other existing pulse-shaping approaches to smooth the transition between blocks when the symbol boundary information for each symbol in the stream of data is no longer identifiable.

Various embodiments in accordance with the present disclosure provide an improved solution for smoothing the transition between symbols blocks within the stream of data. By applying a soft edge pulse-shaping process, for example, by appending a ramp-down tail sequence to a first block of the stream of data after a last sample of the first block, and generating a ramp-up head sequence for a second block immediately after the first block, overlapping the ramp-down tail sequence of the first block, based on a head sequence of the second block, the summation of the overlapped ramp-down tail sequence and the ramp-up head sequence can constitute a smooth transition between the first block and the second block in the data stream. Compared with existing pulse-shaping approaches, such as WOLA or channel filtering, no symbol boundary information is needed for implementing the transition smoothing scheme disclosed herein. It is understood that the transition smoothing scheme disclosed herein can also be applied to data streams where the symbol boundary information is obtainable (e.g., having only one component carrier).

FIG. 1 illustrates an exemplary wireless network 100, in which certain aspects of the present disclosure may be implemented, according to some embodiments of the present disclosure. As shown in FIG. 1, wireless network 100 may include a network of nodes, such as a user equipment (UE) 102, an access node 104, and a core network element 106. User equipment 102 may be any terminal device, such as a mobile phone, a desktop computer, a laptop computer, a tablet, a vehicle computer, a gaming console, a printer, a positioning device, a wearable electronic device, a smart sensor, or any other device capable of receiving, processing, and transmitting information, such as any member of a vehicle to everything (V2X) network, a cluster network, a smart grid node, or an Internet-of-Things (IoT) node. It is understood that user equipment 102 is illustrated as a mobile phone simply by way of illustration and not by way of limitation.

Access node 104 may be a device that communicates with user equipment 102, such as a wireless access point, a base station (BS), a Node B, an enhanced Node B (eNodeB or eNB), a next-generation NodeB (gNodeB or gNB), a cluster master node, or the like. Access node 104 may have a wired connection to user equipment 102, a wireless connection to user equipment 102, or any combination thereof. Access node 104 may be connected to user equipment 102 by multiple connections, and user equipment 102 may be connected to other access nodes in addition to access node 104. Access node 104 may also be connected to other user equipments. It is understood that access node 104 is illustrated by a radio tower by way of illustration and not by way of limitation.

Core network element 106 may serve access node 104 and user equipment 102 to provide core network services. Examples of core network element 106 may include a home subscriber server (HSS), a mobility management entity (MME), a serving gateway (SGW), or a packet data network gateway (PGW). These are examples of core network elements of an evolved packet core (EPC) system, which is a core network for the LTE system. Other core network elements may be used in LTE and in other communication systems. In some embodiments, core network element 106 includes an access and mobility management function (AMF) device, a session management function (SMF) device, or a user plane function (UPF) device, of a core network for the NR system. It is understood that core network element 106 is shown as a set of rack-mounted servers by way of illustration and not by way of limitation.

Core network element 106 may connect with a large network, such as the Internet 108, or another Internet Protocol (IP) network, to communicate packet data over any distance. In this way, data from user equipment 102 may be communicated to other user equipments connected to other access points, including, for example, a computer 110 connected to Internet 108, for example, using a wired connection or a wireless connection, or to a tablet 112 wirelessly connected to Internet 108 via a router 114. Thus, computer 110 and tablet 112 provide additional examples of possible user equipments, and router 114 provides an example of another possible access node.

A generic example of a rack-mounted server is provided as an illustration of core network element 106. However, there may be multiple elements in the core network including database servers, such as a database 116, and security and authentication servers, such as an authentication server 118. Database 116 may, for example, manage data related to user subscription to network services. A home location register (HLR) is an example of a standardized database of subscriber information for a cellular network. Likewise, authentication server 118 may handle authentication of users, sessions, and so on. In the NR system, an authentication server function (AUSF) device may be the specific entity to perform user equipment authentication. In some embodiments, a single server rack may handle multiple such functions, such that the connections between core network element 106, authentication server 118, and database 116, may be local connections within a single rack.

Figure 9:
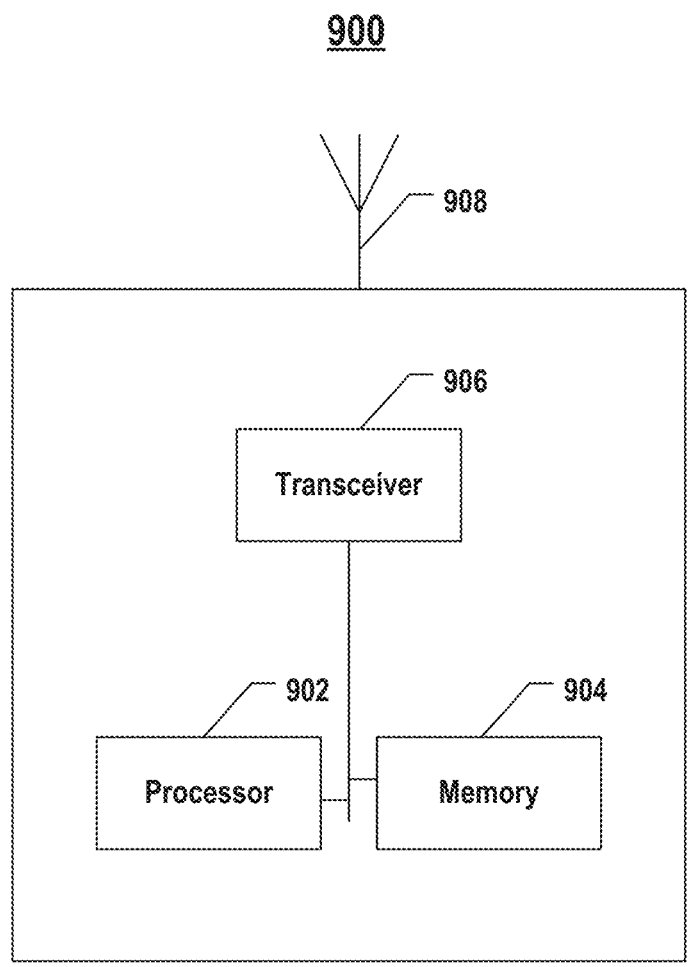
FIG. 9 illustrates a block diagram of an exemplary node, according to some embodiments of the present disclosure.

Each element in FIG. 1 may be considered a node of wireless network 100. More detail regarding the possible implementation of a node is provided by way of example in the description of a node 900 in FIG. 9. Node 900 may be configured as user equipment 102, access node 104, or core network element 106 in FIG. 1. Similarly, node 900 may also be configured as computer 110, router 114, tablet 112, database 116, or authentication server 118 in FIG. 1. As shown in FIG. 9, node 900 may include a processor 902, a memory 904, and a transceiver 906. These components are shown as connected to one another by a bus, but other connection types are also permitted. When node 900 is user equipment 102, additional components may also be included, such as a user interface (UI), sensors, and the like. Similarly, node 900 may be implemented as a blade in a server system when node 900 is configured as core network element 106. Other implementations are also possible.

Transceiver 906 may include any suitable device for sending and/or receiving data. Node 900 may include one or more transceivers, although only one transceiver 906 is shown for simplicity of illustration. An antenna 908 is shown as a possible communication mechanism for node 900. Multiple antennas and/or arrays of antennas may be utilized. Additionally, examples of node 900 may communicate using wired techniques rather than (or in addition to) wireless techniques. For example, access node 104 may communicate wirelessly to user equipment 102 and may communicate by a wired connection (for example, by optical or coaxial cable) to core network element 106. Other communication hardware, such as a network interface card (NIC), may be included as well.

As shown in FIG. 9, node 900 may include processor 902. Although only one processor is shown, it is understood that multiple processors can be included. Processor 902 may include microprocessors, microcontroller units (MCUs), digital signal processors (DSPs), application-specific integrated circuits (ASICs), field-programmable gate arrays (FPGAs), programmable logic devices (PLDs), state machines, gated logic, discrete hardware circuits, and other suitable hardware configured to perform the various functions described throughout the present disclosure. Processor 902 may be a hardware device having one or more processing cores. Processor 902 may execute software. Software shall be construed broadly to mean instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise. Software can include computer instructions written in an interpreted language, a compiled language, or machine code. Other techniques for instructing hardware are also permitted under the broad category of software.

As shown in FIG. 9, node 900 may also include memory 904. Although only one memory is shown, it is understood that multiple memories can be included. Memory 904 can broadly include both memory and storage. For example, memory 904 may include random-access memory (RAM), read-only memory (ROM), static RAM (SRAM), dynamic RAM (DRAM), ferro-electric RAM (FRAM), electrically erasable programmable ROM (EEPROM), CD-ROM or other optical disk storage, hard disk drive (HDD), such as magnetic disk storage or other magnetic storage devices, Flash drive, solid-state drive (SSD), or any other medium that can be used to carry or store desired program code in the form of instructions that can be accessed and executed by processor 902. Broadly, memory 904 may be embodied by any computer-readable medium, such as a non-transitory computer-readable medium.

Processor 902, memory 904, and transceiver 906 may be implemented in various forms in node 900 for performing wireless communication functions. In some embodiments, processor 902, memory 904, and transceiver 906 of node 900 are implemented (e.g., integrated) on one or more system-on-chips (SoCs). In one example, processor 902 and memory 904 may be integrated on an application processor (AP) SoC (sometimes known as a "host," referred to herein as a "host chip") that handles application processing in an operating system environment, including generating raw data to be transmitted. In another example, processor 902 and memory 904 may be integrated on a baseband processor (BP) SoC (sometimes known as a "modem," referred to herein as a "baseband chip") that converts the raw data, e.g., from the host chip, to signals that can be used to modulate the carrier frequency for transmission, and vice versa, which can run a real-time operating system (RTOS). In still another example, processor 902 and transceiver 906 (and memory 904 in some cases) may be integrated on an RF SoC (sometimes known as a "transceiver," referred to herein as an "RF chip") that transmits and receives RF signals with antenna 908. It is understood that in some examples, some or all of the host chip, baseband chip, and RF chip may be integrated as a single SoC. For example, a baseband chip and an RF chip may be integrated into a single SoC that manages all the radio functions for cellular communication.

Referring back to FIG. 1, in some embodiments, any suitable node of wireless network 100 (e.g., user equipment 102 or access node 104) in transmitting signals to another node, for example, from user equipment 102 to access node 104 via an uplink (UL), may implement the transition smoothing scheme as described below in detail. As a result, compared with known solutions, no symbol boundary information is needed when performing the transition smoothing, and the adaptability of the transition smoothing scheme is improved.

Figure 2:
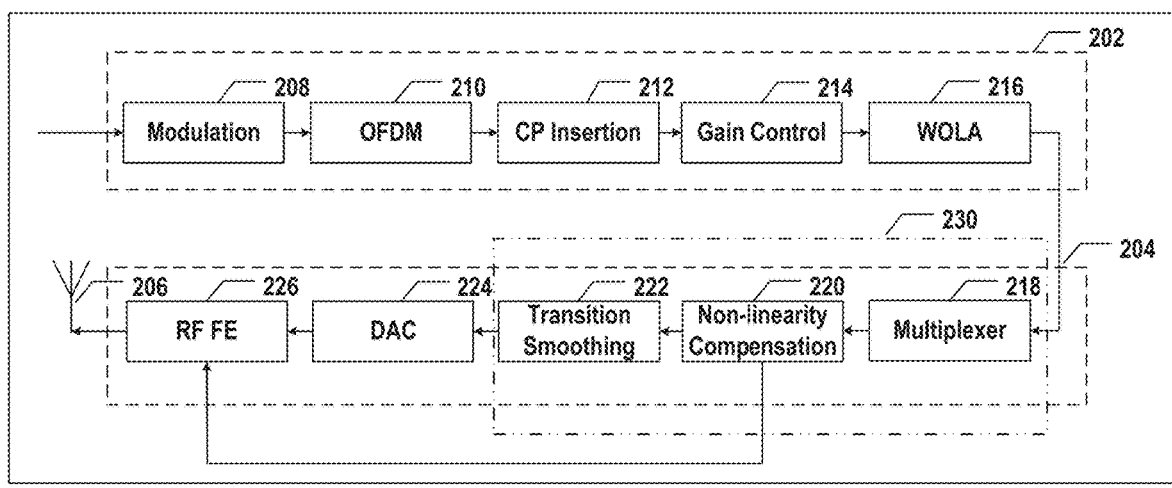
FIG. 2 illustrates a block diagram of an apparatus including a baseband chip and an RF chip implementing transition smoothing on a stream of data, according to some embodiments of the present disclosure.

FIG. 2 illustrates a block diagram of an apparatus including a baseband chip and an RF chip implementing transition smoothing on a stream of data, according to some embodiments of the present disclosure. Apparatus 200 may be an example of any suitable node of wireless network 100, such as user equipment 102. In some embodiments, apparatus 200 may be a system on chip (SoC) including a baseband chip 202 for modulating the raw data, generating OFDM symbols based on the modulated symbol, performing CP insertion on the OFDM symbols, implementing gain adjustments, and applying WOLA on the CP-OFDM symbols, and an RF chip 204 for combing the WOLA-OFDM symbol streams having different component carriers into a stream of data having multi-carriers, adjusting the digital gain and applying nonlinearity compensation to the stream of data, and smoothing the transition between the blocks of the stream of data. RF chip 204 may also be configured to convert the stream of data from digital signals to analog signals (e.g., RF signals) for transmission. It is understood that the functions performed by apparatus 200 may have different allocation implementations between the baseband chip and the RF chip, for example, the gain control adjustment and WOLA may both be applied on the RF chip, or on the baseband chip and the RF chip respectively. Any suitable functioning module allocations between the baseband chip and the RF chip, not departing from the spirit and scope of the present disclosure may be applied.

In some embodiments, apparatus 200 also includes an antenna 206, operatively coupled to RF chip 204, configured to transmit the data in RF signals. In some embodiments, baseband chip 202 is implemented by processor 902 and memory 904, and RF chip 204 is implemented by processor 902, memory 904, and transceiver 906, as described above with respect to FIG. 9. It is understood that besides the various modules of baseband chip 202 and RF chip 204 in the uplink shown in FIG. 2, any other suitable modules, such as modules in the downlink, may be included in baseband chip 202 and RF chip 204 as well.

As described below in detail, by performing the transition smoothing (e.g., soft edge pulse-shaping between the adjacent blocks) after nonlinearity compensation is applied, the transition at the boundary edges of adjacent blocks can be smoothed, and the continuity between adjacent blocks in the time domain can be restored/maintained. Also, compared with existing pulse-shaping approaches, such as WOLA and channel filtering, no symbol boundary information is needed. Thus, the transition smoothing scheme described herein has better adaptability for smoothing transitions between blocks in a stream of data when symbol boundary information of each symbol is unidentifiable in the stream of data (e.g., after symbol streams having different component carriers are combined in an asynchronized manner).

In some embodiments, baseband chip 202 includes a modulation module 208, an OFDM module 210, a cyclic prefix (CP) insertion module 212, a gain control module 214, and a WOLA module 216 in the uplink. Modulation module 208 may be configured to modulate the raw data from a host chip or raw data after coding (e.g., source coding and/or channel coding) using any suitable modulation techniques, such as multi-phase pre-shared key (MPSK) modulation or quadrature amplitude modulation (QAM). OFDM module 210 may be configured to generate a stream of OFDM symbols on multiple subcarriers based on the modulated data. In some embodiments, OFDM module 210 includes a serial-to-parallel converter, an inverse fast Fourier transform (IFFT) unit, and a parallel-to-serial converter. Cyclic prefix insertion module 212 may be configured to insert a cyclic prefix (e.g., the last portion of the OFDM symbol) at the beginning of each OFDM symbol with guard interval exceeding delay spread of the multipath channel to mitigate the effect of ISI. A stream of CP-OFDM symbols thus can be generated by cyclic prefix insertion module 212.

In some embodiments, the gain (e.g., power or amplitude) of each CP-OFDM symbol is then adjusted by gain control module 214 of baseband chip 202. The CP-OFDM symbols with adjusted gain are fed into WOLA module 216 for applying WOLA to each CP-OFDM symbol in baseband chip 202 to generate WOLA-OFDM symbols. When performing CP insertion and WOLA, the entire CP-OFDM symbol is stored in a buffer (not shown) of baseband chip 202, and the samples in the OFDM symbol forming the cyclic prefix or cyclic suffix are copied based on memory addressing in the buffer. As a result, WOLA-OFDM symbols with the adjusted gains are transmitted from baseband chip 202 to RF chip 204 through digital interfaces of both baseband chip 202 and RF chip 204.

RF chip 204 may include a digital front-end (DFE) 230, a digital-to-analog converter (DAC) 224, and an RF front-end (FE) 226 in the uplink. Digital front-end 230 may be implemented by processor 902 shown in FIG. 9, such as one or more MCUs and/or DSPs. Digital front-end 230 may include any elements that process digital signals in RF chip 204 before digital-to-analog converter 224 that converts the digital signals into analog signals (e.g., RF signals) for RF front-end 226 to process. In some embodiments, digital front-end 230 includes a multiplexer module 218, a nonlinearity compensation module 220, and a transition smoothing module 222. Additional elements may be included in digital front-end 230 to perform any other front-end functions on digital signals, such as filtering, up-conversion, or sample-rate conversion.

Multiplexer module 218 may be configured to receive OFDM symbol streams (e.g., WOLA-OFDM symbol streams) having different component carriers from baseband chip 202 through a digital interface (not shown), and combine/aggregate the OFDM symbol streams having different component carriers into a stream of data by combining/aggregating the OFDM symbol streams having different component carriers in the time domain (e.g., adding the asynchronized symbol streams up in the time domain). It is understood that in some embodiments, the stream of data may include one component carrier. For example, multiplexer module 218 may only receive one single OFDM symbol stream with one component carrier and may transform the single OFDM symbol stream to generate a stream of data having the component carrier of the single OFDM symbol stream.

Figure 5:
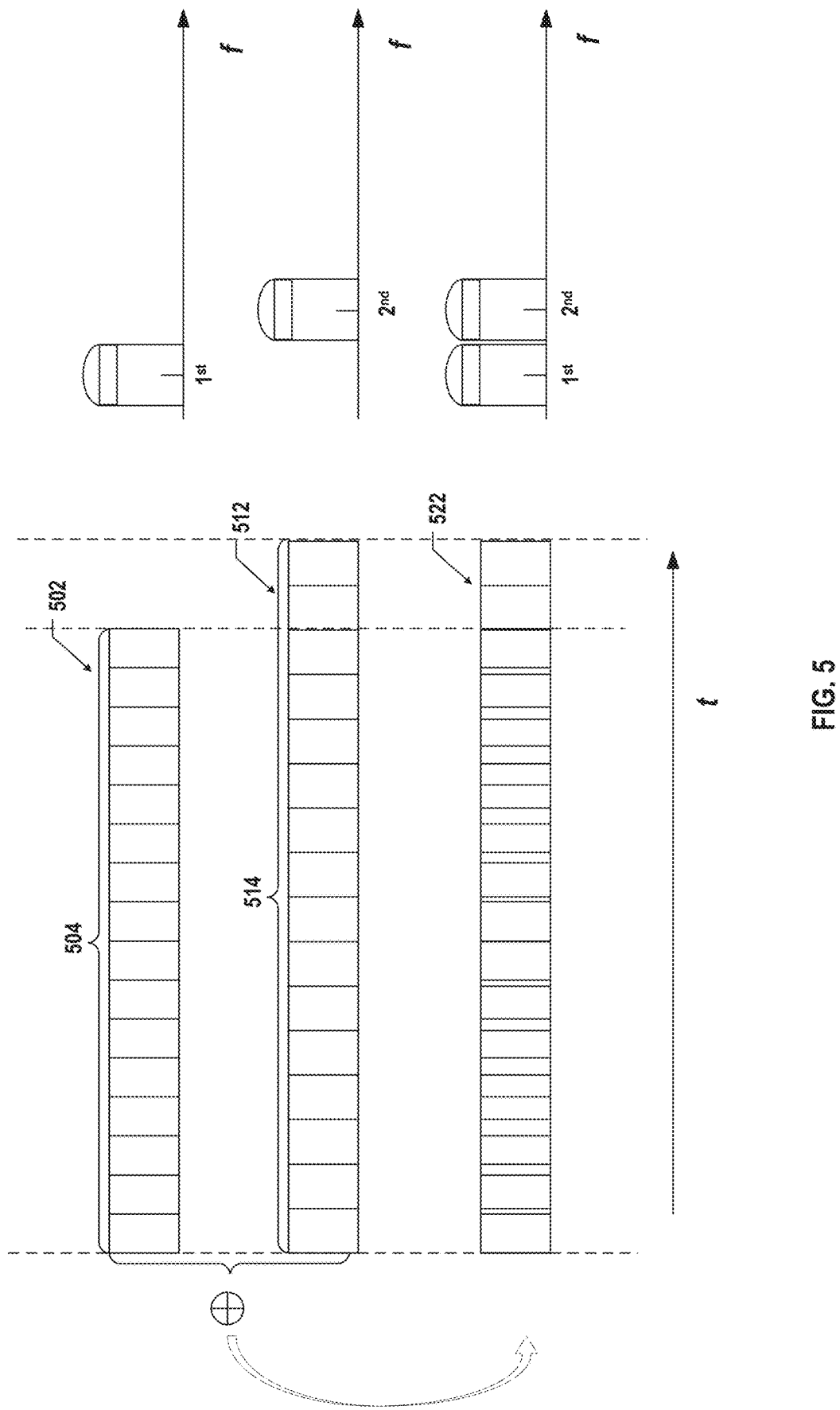
FIG. 5 illustrates an exemplary component carrier aggregation implementation on symbol streams having different component carriers, according to some embodiments of the present disclosure.

For example, FIG. 5 illustrates an exemplary component carrier aggregation implementation on symbol streams having different component carriers, according to some embodiments of the present disclosure. As shown in FIG. 5, a first symbol stream 502 may have a component carrier 504 of a first operating frequency, and a second symbol stream 512 may have a component carrier 514 of a second operating frequency, different from the first operating frequency. First symbol stream 502 and second symbol stream 512 may be aggregated/combined to generate a stream of data 522 having multi-carriers (e.g., including the first component carrier and the second component carrier) by combining/adding up first symbol stream 502 and second symbol stream 512 in the time domain. For example, the starting point of first symbol stream 502 and second symbol stream 512 may be aligned, and first symbol stream 502 and second symbol stream 512 may be added up in the time domain in the overlapped portion. As only one of the starting point or the endpoint of first symbol stream 502 and second symbol stream 512 can be aligned for generating stream of data 522, and as the different component carriers (e.g., component carriers 504 and 514) of the symbol streams are asynchronized, the symbol boundary for each symbol within first symbol stream 502 and second symbol stream 512 become unidentifiable in stream of data 522. In some embodiments, each of first symbol stream 502 and second symbol stream 512 is a OFDM symbol stream and includes OFDM symbols.

For ease of illustration, only two symbol streams (e.g., first symbol stream 502 and second symbol stream 512) are shown for generating stream of data 522. The number of symbol streams having different component carriers shown in FIG. 5 should not be interpreted as limiting the number of symbol streams used for generating stream of data 522. More than two symbol streams can be combined to generate stream of data 522.

Referring back to FIG. 2, nonlinearity compensation module 220 may be configured to further apply digital gain adjustment to the stream of data and compensate for the nonlinearity caused by a gain adjustment applied by a power amplifier (not shown) of RF front-end 226. For example, nonlinearity compensation module 220 may include, among other elements, two digital gain sub-modules and a digital pre-distortion (DPD) sub-module for compensating the nonlinearity of the stream of data (e.g., stream of data 522 shown in FIG. 5) at a predetermined frequency. The frequency of applying the digital gain and the nonlinearity compensation on the stream of data may determine the length of a block in the stream of data. For example, each block in the stream of data may correspond to a unit of data in the stream of data that the digital gain adjustment and the nonlinearity compensation being applied for once. In some embodiments, blocks in the stream of data may have a length equivalent to the length of 1, 2, 3, 5, 10, or more symbols (e.g., equivalent to a length of a symbol slot of 14 symbols), depending on the frequency of the implementation of the digital gain adjustment and the nonlinearity compensation. After the digital gain adjustment and the nonlinearity compensation are applied, the stream of data is divided into a plurality of blocks.

Figure 3:
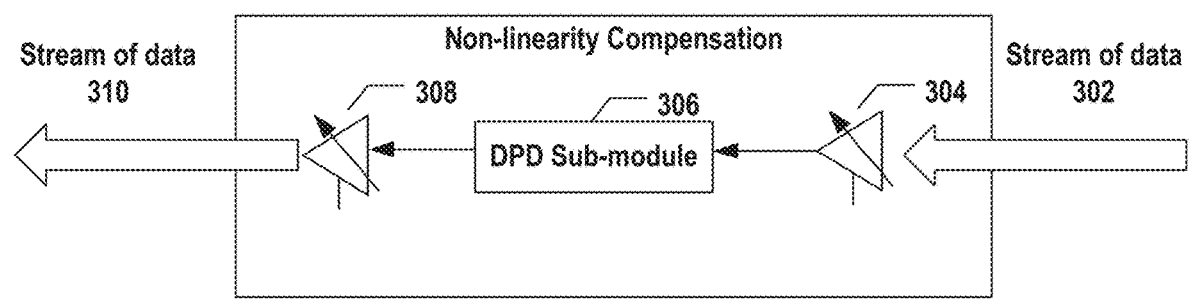
FIG. 3 illustrates a block diagram of an exemplary nonlinearity compensation module of the apparatus shown in FIG. 2, according to some embodiments of the present disclosure.

For example, as illustrated in FIG. 3, nonlinearity compensation module 220 may include a pre-DPD gain control sub-module 304, a digital pre-distortion sub-module 306, and a pre-DAC gain control sub-module 308 for implementing the digital gain adjustment and the nonlinearity compensation. Pre-DPD gain control sub-module 304 may be configured to receive a stream of data 302 (e.g., stream of data 522 in FIG. 5) generated by multiplexer module 218 and adjust the gain of stream of data 302 (e.g., adjust the power or amplitude) to a functioning level of digital pre-distortion sub-module 306 before feeding the stream of data to digital pre-distortion sub-module 306. Digital pre-distortion sub-module 306 may be configured to compensate the nonlinearity caused by the gain adjustments implemented by the power amplifier (not shown) of RF front-end 226 before the stream of data being transmitted. For example, digital pre-distortion sub-module 306 may be configured to apply a digital pre-distortion to the stream of data that can negate the nonlinearity caused by the power amplifier (e.g., applying a distortion being exactly opposite to the nonlinearity caused by the power amplifier). Pre-DAC gain control sub-module 308 may be configured to receive the compensated stream of data from digital pre-distortion sub-module 306, and generate stream of data 310 by applying gain control to the compensated stream of data to a functioning level of DAC 224, and feed stream of data 310 to transition smoothing module 222. Because the applied gain adjustments and the digital pre-distortion (e.g., by pre-DPD gain control sub-module 304, digital pre-distortion sub-module 306, and/or pre-DAC gain control sub-module 308), the smooth transition between adjacent blocks in stream of data 310 is broken.

Referring back to FIG. 2, in some embodiments, transition smoothing module 222 may be configured to smooth the broken-up transition of blocks in stream of data (e.g., stream of data 310) by applying soft edge pulse-shaping process, for example, by appending a ramp-down tail sequence to a first block of the stream of data after a last sample of the first block, and generating a ramp-up head sequence for a second block immediately after the first block overlapping the ramp-down tail sequence of the first block, based on a head sequence of the second block. The summation of the overlapping ramp-down tail sequence and the ramp-up head sequence can constitute a smooth transition between the first block and the second block in the data stream. It is understood that transition smoothing module 222 may be implemented on application-specific integrated circuits (ASICs), discrete hardware circuits, and other suitable hardware configured to perform the various functions described throughout the present disclosure.

Digital-to-analog converter 224 may be configured to convert the stream of data in digital signals into analog signals (e.g., radio signals). RF front-end 226 (also known as "analog front-end") may include any elements between antenna 206 and digital-to-analog converter 224, which handles analog signals. RF front-end 226 may include, for example, RF filters, RF amplifiers (e.g., the power amplifier), local oscillators, and mixers.

Figure 4:
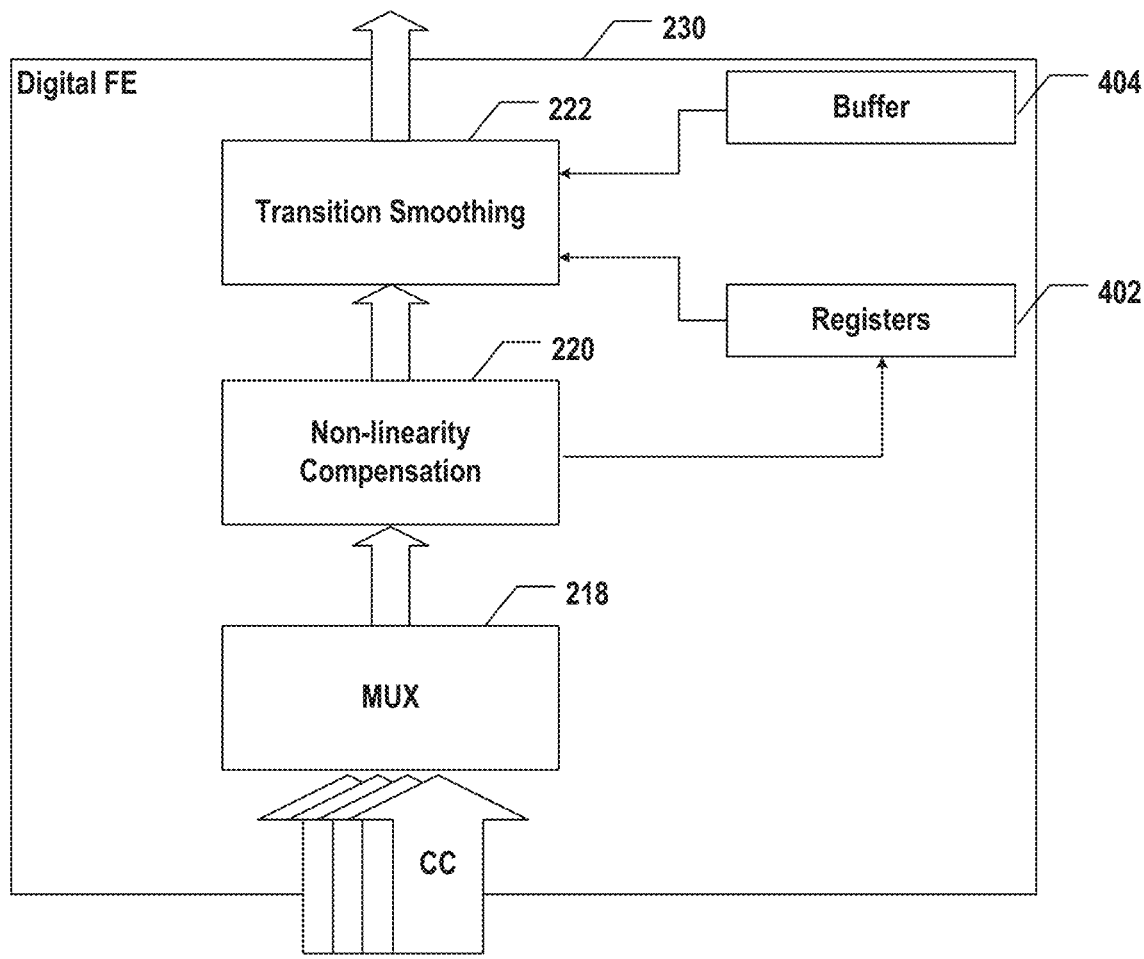
FIG. 4 illustrates an exemplary digital front-end of the RF chip shown in FIG. 2, according to some embodiments of the present disclosure.

FIG. 4 illustrates a detailed block diagram of exemplary digital front-end 230 of RF chip shown in FIG. 2, according to some embodiments of the present disclosure. As described above with respect to FIG. 2, RF chip 204 may include multiplexer module 218, nonlinearity compensation module 220, and transition smoothing module 222. As shown in FIG. 4, in some embodiments, digital front-end 230 may further include a set of registers 402, a buffer 404, which facilitates transition smoothing module 222 to perform transition smoothing implementation of the stream of data using digital front-end 230 disclosed herein.

In some embodiments, OFDM symbol streams having different component carriers (e.g., asynchronized component carriers with different operating frequencies) may be received from a baseband chip, such as baseband chip 202 in FIG. 2, through a digital interface (not shown) of RF chip 204 as one or more continuous data flows. In some embodiments, multiplexer module 218 is configured to combine/aggregate the OFDM symbol streams having different component carriers into a stream of data as described in FIG. 5. A digital gain adjustment and a nonlinearity compensation may be applied periodically (e.g., at a predetermined frequency) to the stream of data by nonlinearity compensation 220, where a gain of the stream of data is adjusted, and a digital pre-distortion is applied. The predetermined frequency for applying the digital gain adjustment and the nonlinearity compensation can be used as the block boundary information (e.g., for identifying the corresponding boundary of the blocks) in the stream of data and may be transmitted to and stored in set of registers 402. After the digital gain adjustment and the nonlinearity compensation is applied, the stream of data is divided into a plurality of blocks.

The stream of data (e.g., divided into a plurality of blocks) with the gain adjusted by nonlinearity compensation module 220 may be transmitted to transition smoothing module 222 for pulse-shaping. For example, buffer 404 may be configured to store an m-sample long copy of the last sample (e.g., a sample sequence of m-sample long, where each sample in the sequence is a copy of the last sample) of a respective block of the stream of data, where m can be any suitable number less than a total number of samples in each block of the stream of data. The last sample of the block may be identified based on block boundary information stored in set of registers 402.

Transition smoothing module 222 may first perform a windowing process, for example, by multiplying the m-sample long copy with a weight (e.g., a ramp-down window), and then append the weighted m-sample long copy to the last sample of the respective block to form a ramp-down tail sequence. The ramp-down tail sequence of each block may overlap with first m samples of (e.g., the m-sample head sequence) of another block next to the respective block. Transition smoothing module 222 may also perform a windowing process on the m-sample head sequence of the successive block to generate a ramp-up head sequence, for example, by multiplying the m-sample head sequence with a weight (e.g., a ramp-up window). The weighted m-sample long copy (e.g., the ramp-down tail sequence) and the weighted m-sample head sequence (e.g., the ramp-up head sequence) may overlap at the block boundary, forming a smooth transition.

Figure 6:
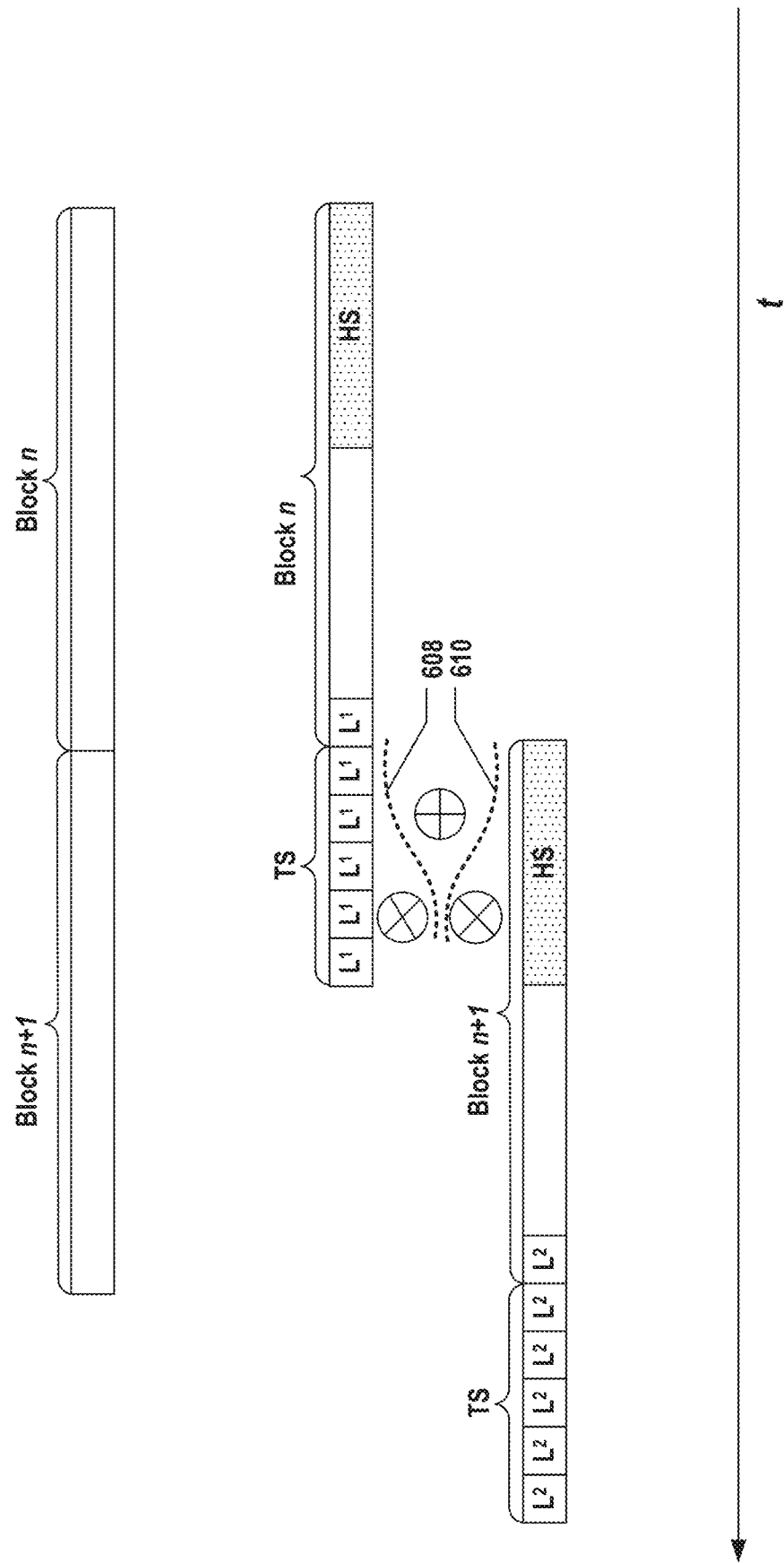
FIG. 6 illustrates an exemplary transition smoothing implementation on blocks of a stream of data, according to some embodiments of the present disclosure.

For example, FIG. 6 illustrates an exemplary transition smoothing implementation on blocks of a stream of data, according to some embodiments of the present disclosure. As shown in FIG. 6, a last sample $L^1$ of a block n may be identified based on a block boundary information (e.g., the boundary, the length, the starting point and/or the endpoint of the block, etc.) corresponding to the frequency of the digital gain adjustment and the nonlinearity compensation applied by a nonlinearity compensation module (e.g., nonlinearity compensation module 220 in FIG. 4) stored in a register (e.g., set of registers 402 in FIG. 4). An m-sample long copy of the last sample $L^1$ may be stored into a buffer (e.g., buffer 404 in FIG. 4). The m-sample long copy of the last sample $L^1$ may be weighted by multiplying a ramp-down window 608, to generate a ramp-down tail sequence TS of block n consisting of m copies of the last sample $L^1$ by, for example, transition smoothing module 222 of digital front-end 230 shown in FIG. 2. After applying the ramp-down tail sequency TS to the end of block n, block n can also end smoothly. As shown in FIG. 6, ramp-down tail sequence TS of block n stored in the buffer may be appended to the last sample of block n and may overlap with the first m samples of (e.g., the m-sample head sequence) of block n+1 next to block n. For example, the first sample of ramp-down tail sequence TS of block n may be aligned with the first sample of block n+1. The m-sample head sequence of block n+1 may be weighted by multiplying a ramp-up window 610, to generate a ramp-up head sequence HS of block n+1 by, for example, transition smoothing module 222 of digital front-end 230 shown in FIG. 2. Ramp-down tail sequence TS of block n and ramp-up head sequence HS of block n+1 may overlap (e.g., the first sample of ramp-down tail sequence TS of block n may be aligned with the first sample of ramp-up head sequence HS of block n+1) and the summation of ramp-down tail sequence TS of block n and ramp-up head sequence HS of block n+1 may form a smooth transition between block n and block n+1. As block n+1 continues to flow, the same transition smoothing process described above with respect to block n may be repeated for block n+1.

Referring back to FIG. 4, the smoothed stream of data may be transmitted to a digital-to-analog converter (e.g., digital-to-analog converter 224 in FIG. 2) for converting the smoothed stream of data in digital signals into analog signals (e.g., radio signals).

It is understood that, depending on the functioning module allocation figuration, digital front-end 230 may further include other modules such as a gain control module and a WOLA module, where WOLA may be performed in a streamlined manner, different from the implementation described with respect to the description of FIG. 2.

Figure 7:
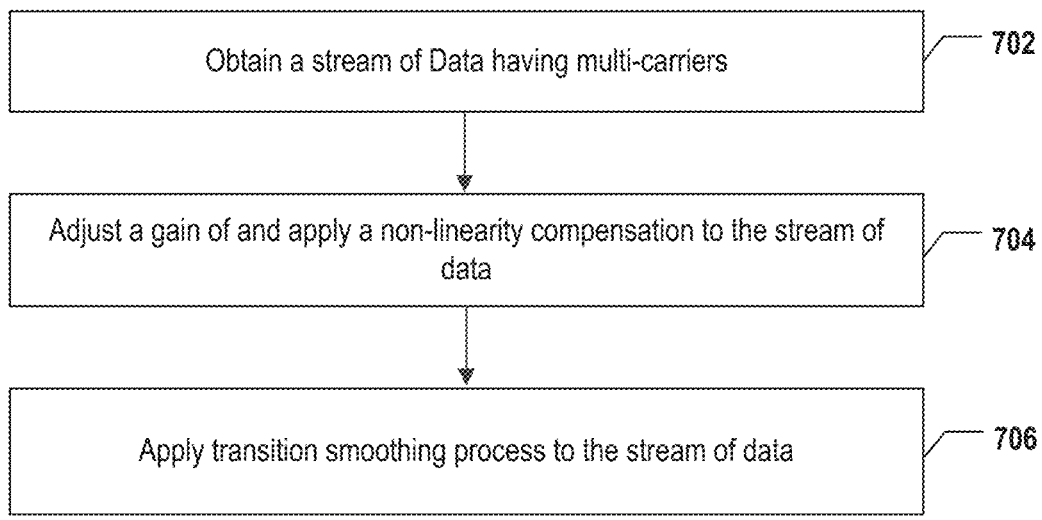
FIG. 7 illustrates a flow chart of an exemplary method for transition smoothing implementation on a stream of data, according to some embodiments of the present disclosure.

FIG. 7 illustrates a flow chart of an exemplary method 700 for transition smoothing implementation on a stream of data, according to some embodiments of the present disclosure. Examples of the apparatus that can perform operations of method 700 include, for example, apparatus 200 depicted in FIG. 2 or any other suitable apparatus disclosed herein. It is understood that the operations shown in method 700 are not exhaustive and that other operations can be performed as well before, after, or between any of the illustrated operations. Further, some of the operations may be performed simultaneously, or in a different order than shown in FIG. 7.

Referring to FIG. 7, method 700 starts at operation 702, in which a stream of data having multi-carriers is obtained by a digital front-end. For example, the stream of data may be generated by a multiplexer module of the digital front-end by combining a plurality of asynchronized symbol streams having different component carriers in the time domain. In some embodiments, each asynchronized symbol stream includes OFDM symbols. As shown in FIG. 2, multiplexer module 218 of digital front-end 230 may generate a stream of data based on asynchronized OFDM symbol streams having different component carriers.

Method 700 proceeds to operation 704, as illustrated in FIG. 7, in which a digital gain adjustment and a nonlinearity compensation are applied to the stream of data received from the multiplexer module by a nonlinearity compensation module. As shown in FIG. 2, nonlinearity compensation module 220 of digital front-end 230 may receive the stream of data from multiplexer module 218 and apply the digital gain adjustment and the nonlinearity compensation to the stream of data at a predetermined frequency. The predetermined frequency corresponds to the length of each block (e.g., the unit of data in the stream of data for the digital gain adjustment and the nonlinearity compensation to apply once) of the stream of data. After the digital gain adjustment and the nonlinearity compensation are applied, the stream of data is divided into the plurality of blocks.

Method 700 proceeds to operation 706, as illustrated in FIG. 7, in which the transition smoothing process (e.g., soft edge-shaping) is applied by a transition smoothing module of the digital front-end to the stream of data. As shown in FIG. 3, transition smoothing module 222 of digital front-end 230 may perform the transition smoothing process described herein on the stream of data (with the digital gain adjustment and the nonlinearity compensation applied by nonlinearity compensation module 220) to smooth the transitions of the plurality of blocks of the stream of data. The details of operation 706 are described below with respect to FIG. 8.

Figure 8:
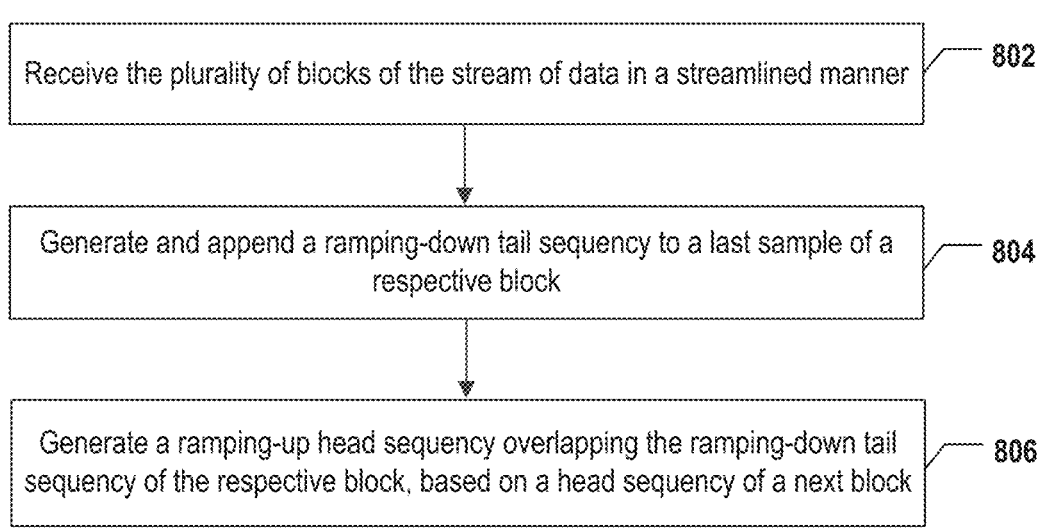
FIG. 8 illustrates a flow chart of another exemplary method for transition smoothing implementation on a stream of data, according to some embodiments of the present disclosure.

FIG. 8 illustrates a flow chart of another exemplary method 800 for transition smoothing implementation on a stream of data, according to some embodiments of the present disclosure. Examples of the apparatus that can perform operations of method 800 include, for example, digital front-end 230 depicted in FIGS. 2 and 4 or any other suitable apparatus disclosed herein. It is understood that the operations shown in method 800 are not exhaustive and that other operations can be performed as well before, after, or between any of the illustrated operations. Further, some of the operations may be performed simultaneously, or in a different order than shown in FIG. 8.

Referring to FIG. 8, method 800 starts at operation 802, in which the plurality of blocks of the stream of data are received by a transition smoothing module in a streamlined manner. As shown in FIG. 4, the plurality of blocks with the digital gain adjustment and the nonlinearity compensation applied by nonlinearity compensation module 220 are received by transition smoothing module 222. In some embodiments, the stream of data is divided into the plurality of blocks based on the predetermined frequency of the digital gain adjustment and the nonlinearity compensation applied by nonlinearity compensation module 220. In some embodiments, the predetermined frequency may be used for identifying the boundary information of each block (e.g., the boundary, the length, the starting point and/or the endpoint of the block) of the stream of data.

Method 800 proceeds to operation 804, as illustrated in FIG. 8, in which a ramp-down tail sequence is generated and appended to a last sample of a respective block. For example, as shown in FIG. 4, buffer 404 may be configured to store an m-sample length copy of the last sample (e.g., a sample sequence of m-sample long, where each sample in the sequence is a copy of the last sample) of a respective block of the stream of data, where m can be any suitable number less than a total number of samples in each block of the stream of data. The last sample of the block may be identified based on block boundary information stored in set of registers 402. Transition smoothing module 222 may perform a windowing process, for example, by multiplying the m-sample length copy with a weight (e.g., a ramp-down window), and then append the weighted m-sample length copy to the last sample of the respective symbol to form a ramp-down tail sequence. The ramp-down tail sequence of each block may overlap with first m samples of (e.g., the m-sample head sequence) of another block next to the respective block (e.g., a successive block).

Method 800 proceeds to operation 806, in which a ramp-up head sequence is generated based on the m-sample head sequence of the successive block. For example, as shown in FIG. 4, buffer 404 may be configured to perform a windowing process on the m-sample head sequence of the successive block by multiplying the m-sample head sequence with a weight (e.g., a ramp-up window). The weighted m-sample length copy (e.g., the ramp-down tail sequence) and the weighted m-sample head sequence (e.g., the ramp-up head sequence) may overlap at the block boundary, forming a smooth transition.

In various aspects of the present disclosure, the functions described herein may be implemented in hardware, software, firmware, or any combination thereof. If implemented in software, the functions may be stored on or encoded as instructions or code on a non-transitory computer-readable medium. Computer-readable media includes computer storage media. Storage media may be any available media that can be accessed by a computing device, such as node 900 in FIG. 9. By way of example, and not limitation, such computer-readable media can include RAM, ROM, EEPROM, CD-ROM or other optical disk storage, HDD, such as magnetic disk storage or other magnetic storage devices, Flash drive, SSD, or any other medium that can be used to carry or store desired program code in the form of instructions or data structures and that can be accessed by a processing system, such as a mobile device or a computer. Disk and disc, as used herein, includes CD, laser disc, optical disc, DVD, and floppy disk where disks usually reproduce data magnetically, while discs reproduce data optically with lasers. Combinations of the above should also be included within the scope of computer-readable media.

According to one aspect of the present disclosure, a system on chip (SoC) for wireless communication includes a digital front-end. The digital front-end is configured to obtain a stream of data having one carrier or multi-carriers. The stream of data is divided into a plurality of blocks. The digital front-end is also configured to adjust a gain of the stream of data based on a predetermined frequency corresponding to a length of each of the plurality of blocks. The digital front-end is also configured to append a ramp-down tail sequence to a first block of the stream of data after a last sample of the first block, and generate a ramp-up head sequence for a second block immediately after the first block, based on a head sequence of the second block.

In some embodiments, to append the ramp-down tail sequence, the digital front-end is further configured to apply a ramp-down window to the last sample of the first block to generate the ramp-down tail, and append the ramp-down tail sequence to the last sample of the first block.

In some embodiments, to generate the ramp-up head sequence, the digital front-end is further configured to apply a ramp-up window to the head sequence of the second block.

In some embodiments, to obtain the stream of data, the digital front-end is further configured to combine a plurality of asynchronized symbol streams having different component carriers in a time domain. The at least one carrier of the stream of data includes the different component carriers of the plurality of asynchronized symbol streams.

In some embodiments, each of the plurality of asynchronized symbol streams comprises orthogonal frequency-division multiplexing (OFDM) symbols.

In some embodiments, the digital front-end is further configured to compensate a nonlinearity of the stream of data at the predetermined frequency.

In some embodiments, to compensate the nonlinearity, the digital front-end is further configured to apply a digital pre-distortion to the stream of data.

In some embodiments, a length of the ramp-down tail sequence of the first block equals a length of the ramp-up head sequence of the second block.

In some embodiments, the ramp-down tail sequence of the first block overlaps the ramp-up head sequence of the second block.

According to another aspect of the present disclosure, an RF chip includes a digital front-end including a multiplexer module, a nonlinearity compensation module, and a transition smoothing module. The multiplexer module is configured to combine a plurality of OFDM symbol streams having different component carriers in a time domain or to transform a single OFDM symbol stream to generate a stream of data having at least one carrier. The nonlinearity compensation module is configured to adjust a gain of the stream of data based on a predetermined frequency corresponding to a length of each of a plurality of blocks, and apply a digital pre-distortion to the stream of data to compensate a compensate nonlinearity of the stream of data. The stream of data is divided into the plurality of blocks. The stream of data is divided into the plurality of blocks. The transition smoothing module is configured to apply a soft edge pulse-shaping process to smooth transitions of the plurality of blocks.

In some embodiments, to apply the soft edge process, the transition smoothing module is further configured to append a ramp-down tail sequence to a first block of the stream of data after a last sample of the first block, and generate a ramp-up head sequence for a second block immediately after the first block, based on a head sequence of the second block.

In some embodiments, to append the ramp-down tail sequence, the transition smoothing module is further configured to apply a ramp-down window to the last sample of the first block to generate the ramp-down tail sequence, and append the ramp-down tail sequence to the last sample of the first block.

In some embodiments, to append the ramp-up head sequence, the transition smoothing module is further configured to apply a ramp-up window to the head sequence of the second block.

In some embodiments, a length of the ramp-down tail sequence of the first block equals a length of the ramp-up head sequence of the second block.

In some embodiments, the ramp-down tail sequence of the first block overlaps the ramp-up head sequence of the second block.

According to still another aspect of the present disclosure, a method for wireless communication is disclosed. A stream of data having at least one carrier is obtained. The stream of data is divided into a plurality of blocks. A gain of the stream of data is adjusted at a predetermined frequency corresponding to a length of each of the plurality of blocks. A ramp-down tail sequence is appended to a first block of the stream of data after a last sample of the first block. A ramp-up head sequence is generated for a second block immediately after the first block, based on a head sequence of the second block.

In some embodiments, the method further includes combining a plurality of asynchronized symbol streams having different component carriers in a time domain to generate the stream of data.

In some embodiments, a length of the ramp-down tail sequence of the first block equals a length of the ramp-up head sequence of the second block.

In some embodiments, the ramp-down tail sequence of the first block overlaps the ramp-up head sequence of the second block.

The foregoing description of the specific embodiments will so reveal the general nature of the present disclosure that others can, by applying knowledge within the skill of the art, readily modify and/or adapt for various applications such specific embodiments, without undue experimentation, without departing from the general concept of the present disclosure. Therefore, such adaptations and modifications are intended to be within the meaning and range of equivalents of the disclosed embodiments, based on the teaching and guidance presented herein. It is to be understood that the phraseology or terminology herein is for the purpose of description and not of limitation, such that the terminology or phraseology of the present specification is to be interpreted by the skilled artisan in light of the teachings and guidance.

Embodiments of the present disclosure have been described above with the aid of functional building blocks illustrating the implementation of specified functions and relationships thereof. The boundaries of these functional building blocks have been arbitrarily defined herein for the convenience of the description. Alternate boundaries can be defined so long as the specified functions and relationships thereof are appropriately performed.

The Summary and Abstract sections may set forth one or more but not all exemplary embodiments of the present disclosure as contemplated by the inventor(s), and thus, are not intended to limit the present disclosure and the appended claims in any way.

Various functional blocks, modules, and steps are disclosed above. The particular arrangements provided are illustrative and without limitation. Accordingly, the functional blocks, modules, and steps may be re-ordered or combined in different ways than in the examples provided above. Likewise, certain embodiments include only a subset of the functional blocks, modules, and steps, and any such subset is permitted.

The breadth and scope of the present disclosure should not be limited by any of the above-described exemplary embodiments, but should be defined only in accordance with the following claims and their equivalents.

What is claimed is:

1. A system on chip (SoC) for wireless communication, comprising a digital front-end configured to:
    obtain a stream of data having at least one carrier, wherein the stream of data is divided into a plurality of blocks;
    adjust a gain of the stream of data at a predetermined frequency corresponding to a length of each of the plurality of blocks;
    append a ramp-down tail sequence to a first block of the stream of data with the adjusted gain after a last sample of the first block; and
    generate a ramp-up head sequence for a second block immediately after the first block based on a head sequence of the second block.

2. The SoC of claim 1, wherein to append the ramp-down tail sequence, the digital front-end is further configured to:
    apply a ramp-down window to the last sample of the first block to generate the ramp-down tail sequence; and
    append the ramp-down tail sequence after the last sample of the first block.

3. The SoC of claim 1, wherein to generate the ramp-up head sequence, the digital front-end is further configured to apply a ramp-up window to the head sequence of the second block.

4. The SoC of claim 1, wherein to obtain the stream of data, the digital front-end is further configured to combine a plurality of asynchronized symbol streams having different component carriers in a time domain, wherein the at least one carrier of the stream of data includes the different component carriers of the plurality of asynchronized symbol streams.

5. The SoC of claim 4, wherein each of the plurality of asynchronized symbols streams comprises orthogonal frequency-division multiplexing (OFDM) symbols.

6. The SoC of claim 1, wherein the digital front-end is further configured to compensate a nonlinearity of the stream of data at the predetermined frequency.

7. The SoC of claim 6, wherein to compensate the nonlinearity, the digital front-end is further configured to apply a digital pre-distortion to the stream of data.

8. The SoC of claim 1, wherein the digital front-end is further configured to identify a block boundary of each of the plurality of blocks based on the predetermined frequency for adjusting the gain of the stream of data.

9. The SoC of claim 1, wherein a length of the ramp-down tail sequence of the first block equals a length of the ramp-up head sequence of the second block.

10. The SoC of claim 1, wherein the ramp-down tail sequence of the first block overlaps the ramp-up head sequence of the second block.

11. A radio frequency (RF) chip comprising a digital front-end, wherein the digital front-end comprises:
a multiplexer module configured to combine a plurality of orthogonal frequency-division multiplexing (OFDM) symbol streams having different component carriers in a time domain or to transform a single OFDM symbol stream to generate a stream of data having at least one carrier;
a nonlinearity compensation module configured to:
adjust a gain of the stream of data at a predetermined frequency corresponding to a length of each of a plurality of blocks; and
apply a digital pre-distortion to the stream of data to compensate a nonlinearity of the stream of data, wherein the stream of data with the adjusted gain is divided into the plurality of blocks; and
a transition smoothing module configured to apply soft edge pulse-shaping to smooth transitions of the plurality of blocks.

12. The RF chip of claim 11, wherein to apply soft edge pulse-shaping, the transition smoothing module is further configured to:
append a ramp-down tail sequence to a first block of the stream of data after a last sample of the first block; and
generate a ramp-up head sequence for a second block immediately after the first block, based on a head sequence of the second block.

13. The RF chip of claim 12, wherein to append the ramp-down tail sequence, the transition smoothing module is further configured to:
apply a ramp-down window to the last sample of the first block to generate the ramp-down tail sequence; and
append the ramp-down tail sequence after the last sample of the first block.

14. The RF chip of claim 12, wherein to generate the ramp-up head sequence, the transition smoothing module is further configured to apply a ramp-up window to the head sequence of the second block.

15. The RF chip of claim 12, wherein a length of the ramp-down tail sequence of the first block equals a length of the ramp-up head sequence of the second block.

16. The RF chip of claim 12, wherein the ramp-down tail sequence of the first block overlaps the ramp-up head sequence of the second block.

17. A method implemented by a system on chip (SoC) for wireless communication, comprising:
obtaining a stream of data having at least one carrier, wherein the stream of data is divided into a plurality of blocks;
adjusting a gain of the stream of data based on a predetermined frequency corresponding to a length of each of the plurality of blocks;
appending a ramp-down tail sequence to a first block of the stream of data with the adjusted gain after a last sample of the first block; and
generating a ramp-up head sequence for a second block immediately after the first block, based on a head sequence of the second block.

18. The method of claim 17, the method further comprising combining a plurality of asynchronized symbol streams having different component carriers in a time domain to generate the stream of data.

19. The method of claim 17, wherein a length of the ramp-down tail sequence of the first block equals a length of the ramp-up head sequence of the second block.

20. The method of claim 17, wherein the ramp-down tail sequence of the first block overlaps the ramp-up head sequence of the second block.

* * * * *